(12) United States Patent
Wilkinson et al.

(10) Patent No.: US 8,983,933 B2
(45) Date of Patent: Mar. 17, 2015

(54) COSTS OF OPERATIONS ACROSS COMPUTING SYSTEMS

(71) Applicant: Hewlett-Packard Development Company, L.P., Houston, TX (US)

(72) Inventors: William K. Wilkinson, San Mateo, CA (US); Alkiviadis Simitsis, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 13/723,895

(22) Filed: Dec. 21, 2012

(65) Prior Publication Data

US 2014/0181080 A1    Jun. 26, 2014

(51) Int. Cl.
*G06F 17/30* (2006.01)

(52) U.S. Cl.
CPC .... *G06F 17/30469* (2013.01); *G06F 17/30011* (2013.01); *G06F 17/30023* (2013.01); *G06F 17/30463* (2013.01)
USPC ........... 707/719; 707/718; 707/707; 707/709; 707/713; 709/201; 709/203; 709/213; 709/219

(58) Field of Classification Search
CPC ................... G06F 17/30011; G06F 17/30023; G06F 17/30469; G06F 17/30463
USPC .......... 707/707, 709, 713, 718–719; 709/201, 709/203, 213, 219
See application file for complete search history.

(56) References Cited

U.S. PATENT DOCUMENTS

| 8,219,518 | B2 | 7/2012 | Jin et al. | |
| 2006/0242089 | A1* | 10/2006 | Vahidi et al. | 705/400 |
| 2008/0281652 | A1* | 11/2008 | Iqbal et al. | 705/7 |
| 2009/0125448 | A1* | 5/2009 | Borkovec et al. | 705/36 R |
| 2012/0005308 | A1* | 1/2012 | Cok | 709/219 |
| 2012/0089595 | A1 | 4/2012 | Jaecksch | |
| 2013/0166871 | A1* | 6/2013 | Chen et al. | 711/170 |

OTHER PUBLICATIONS

Belgin Ergenc, "A Query Execution Model for Mobile Sources Restricted Access to Environmental Data Integration," These, Doctorat De L'Universite De Toulouse, Jan. 24, 2008, pp. 1-122, Available at: <thesesups.ups-tlse.fr/168/1/Ergenc_Belgin.pdf>.
Challenge 3: Information Integration, IT4BI-DC, Erasmus Mundus Joint Doctorate on Information Technologies for Business Intelligence, 2012, pp. 1-7, Available at: <it4bi-dc.ulb.ac.be/challenge3>.
Matthias Bohm, "Cost-Based Optimization of Integration Flows," Dissertation, Technische Universität Dresden, Mar. 15, 2011, pp. i-227, Available at: <db.inl.tu-dresden.de/misc/team/boehm/pubs/diss_final.pdf>.

* cited by examiner

*Primary Examiner* — Frantz Coby
(74) *Attorney, Agent, or Firm* — Hewlett-Packard Patent Department

(57) ABSTRACT

Disclosed herein are techniques for measuring or assessing the costs of executing operations across a plurality of computing systems. The cost of transferring data across at least one arrangement of computing systems is determined. The cost of executing at least one arrangement of the operations is also determined.

20 Claims, 4 Drawing Sheets

| src/tgt | $e_1$ | $e_2$ |
|---|---|---|
| $e_1$ | 1 | $c_{12} * 2$ |
| $e_2$ | $c_{21}$ | 2 |

420

| src/tgt | $e_1$ | $e_2$ |
|---|---|---|
| $e_1$ | — | $c_{12} * 4$ |
| $e_2$ | — | 4 |

422

| src/tgt | $e_1$ | $e_2$ |
|---|---|---|
| $e_1$ | — | $\min(c_{12} * 4, c_{12} * 8)$ |
| $e_2$ | — | $\min(c_{21} * c_{12} * 4, 8)$ |

424

| src/tgt | $e_1$ | $e_2$ |
|---|---|---|
| $e_1$ | $c_{12} * 4 * c_{21}$ | $c_{12} * 8$ |
| $e_2$ | $4 * c_{21}$ | 8 |

COSTS OF OPERATIONS ACROSS COMPUTING SYSTEMS

BACKGROUND

Many organizations maintain heterogeneous systems of information technology infrastructure comprising assorted data formats originating from multiple sources. For example, an organization may use a data warehouse to manage structured data and a map-reduce engine to manage semi-structured or unstructured data. Tools may be provided to extract, transform, and load data ("ETL tools"). Some ETL tools permit a user to specify a series of operations that process data from multiple sources or to perform other functions.

BRIEF DESCRIPTION OF THE DRAWINGS

FIG. 4 is a further working example in accordance with aspects of the present disclosure.

DETAILED DESCRIPTION

As noted above, ETL tools allow users to specify a series of operations that process data from various sources. The operations in the series may be carried out across different computing systems. A user may specify which execution environment to utilize for each operation. However, users may not have enough information to determine the optimal environment to select for each operation. While some operations may be implemented in multiple environments, other operations may execute more efficiently in a particular environment. Furthermore, users may not have enough information about other factors that may be relevant to performance (e.g., hardware, size of input data, etc.). Thus, many ETL tools may preempt selections made by a user, if it determines that a more optimal arrangement exists. However, in order to determine whether a more optimal arrangement exists, reliable metric data may be necessary. Such data may account for various configurations and arrangements of the operations.

In view of the foregoing, disclosed herein are a system, non-transitory computer readable medium and method for calculating or measuring the costs of executing a plurality or series of operations across computing systems. In one example, a cost of transferring data across at least one arrangement of a plurality of computing systems or platforms may be determined. In another example, a cost of executing at least one arrangement of a series of operations across at least one arrangement of the plurality of computer systems may be determined. In another example, the costs may be stored in a database. The costs may be used to determine whether an arrangement specified by a user is optimal and may be used to determine a more optimal arrangement, if needed. Thus, rather than being concerned with the efficiency of a selected arrangement, users may be rest assured that a more efficient arrangement will be automatically determined, if one exists. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
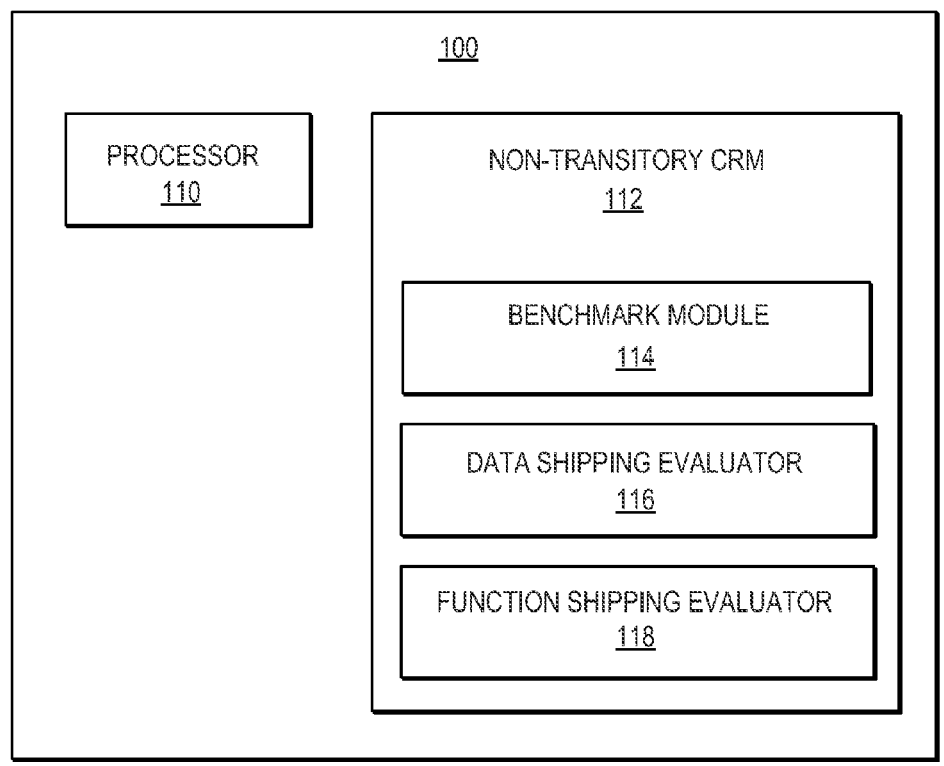
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. The instructions may include a benchmark module 114, a data shipping evaluator 116, and a function shipping evaluator 118. In one example, non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will be described in more detail below, the instructions in benchmark module 114 may cause processor 110 to execute a plurality of operations to measure a performance thereof. The plurality of operations may be adaptable to execute across a plurality of computing systems. Data shipping evaluator 116 may cause processor 110 to determine a cost of transferring data across at least one arrangement of a plurality of computing systems. Function shipping evaluator 118 may determine a cost of executing at least one arrangement of the plurality of operations across at least one arrangement of the plurality of computer systems. At least some of the computer systems may comprise at least one execution engine to carry out at least one of the operations. Each computer system may also comprise a physical computer apparatus. Furthermore, at least some of the computer systems may comprise a data repository. The results of data shipping evaluator 116 and function shipping evaluator 118 may be stored in a database by a standing data module.

A cost determination may be at least partially based on a cost of transferring data across different arrangements of the computing systems. Transferring data directly from one computing system to another may cost less than transferring data to an intermediate repository before transferring the data to its final destination. Thus, at least one arrangement or permutation of computing systems may be tested and measured. Such considerations may be "data shipping" considerations. In another aspect, a cost determination may be at least partially based on whether an execution environment running on a particular hardware is optimal for carrying out an operation. These considerations may be "function shipping" considerations. An execution environment may be considered optimal for an operation if it can execute that operation more efficiently than any other candidate execution environment. These costs may be stored as standing data and analyzed when a series of operations is being defined by a user to determine whether a more optimal arrangement exists.

Figure 2:
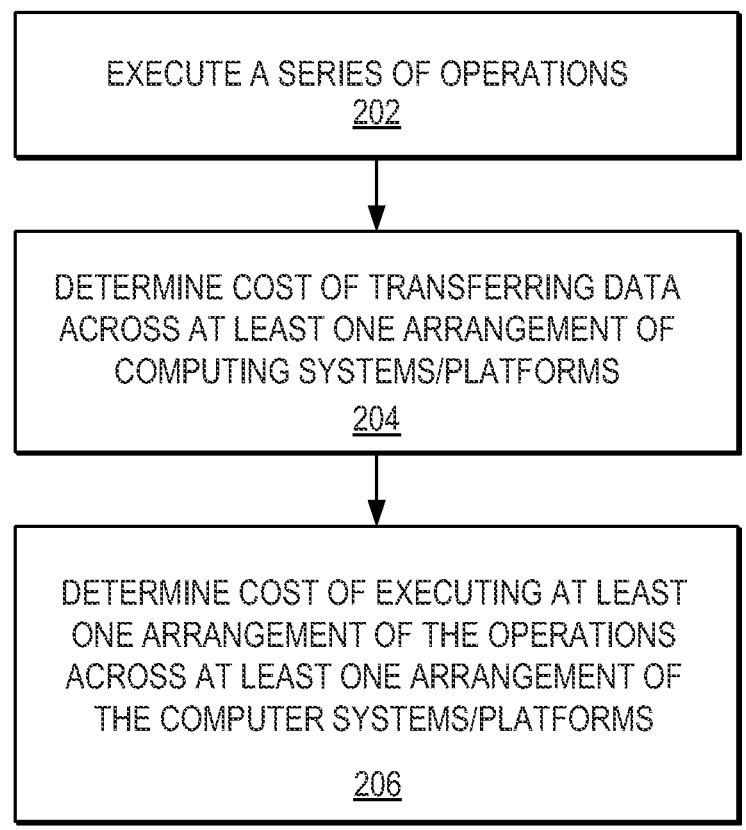
FIG. 2 is a flow diagram of an example method in accordance with aspects of the present disclosure.
Figure 3:
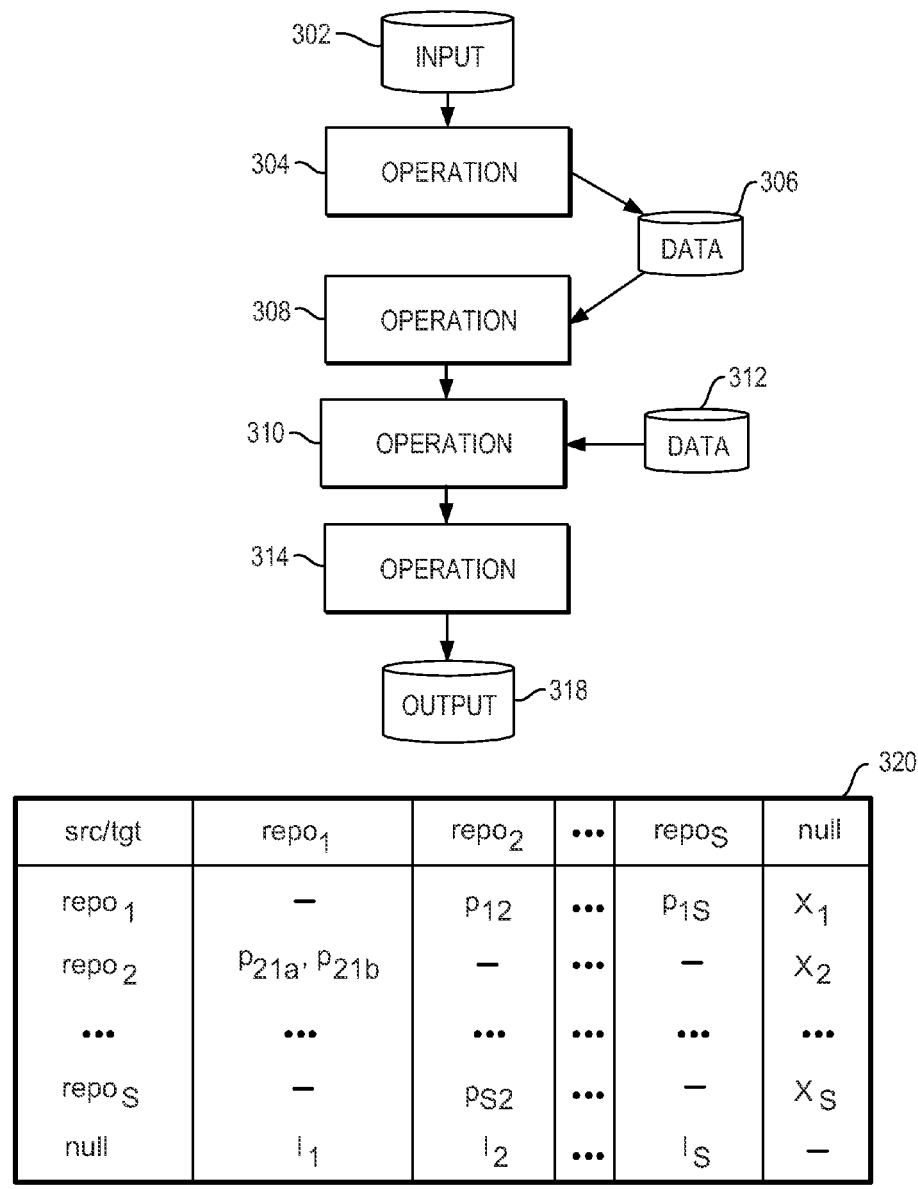
FIG. 3 is a working example in accordance with aspects of the present disclosure.

Working examples of the system, method, and non-transitory computer-readable medium are shown in FIGS. 2-5. In particular, FIG. 2 illustrates a flow diagram of an example method 200 for measuring costs of a series of operations. FIGS. 3-4 show different working examples in accordance with the techniques disclosed herein. The actions shown in FIGS. 3-4 will be discussed below with regard to the flow diagram of FIG. 2.

As shown in block 202 of FIG. 2, a series of operations may be executed. In one example, a script generator module may generate a series of computer readable instructions that initiate each operation. As noted above, the series of operations may be executed across a plurality of computing systems in order to measure the performance of the operations. Referring to FIG. 3, an illustrative series of operations are shown. Operations 304, 308, 310, and 314 are shown arranged in a predetermined order. In one example, an operation may be defined as a module that processes input data and generates an output. Input data 302 is shown being transferred into operation 304; operation 304 is shown writing data to repository 306; data from repository 306 is shown being transferred into operation 308 and data from operation 308 is shown being transferred directly into operation 310; operation 310 is also shown reading data from repository 312; the output of operation 310 is shown being transferred to operation 314, which generates a final output into output data repository 318. Each operation shown in FIG. 3 may be executed in a computing system comprising a physical computer apparatus hosting an execution engine enabled to carry out the operation. Each data repository may also be hosted in a computing system comprising at least one physical computer apparatus.

Referring back to FIG. 2, a cost of transferring data across at least one arrangement of a plurality of computing systems/platforms may be determined, as shown in block 204. Referring back to FIG. 3, the cost of transferring data contained in input data 302, repository 306, and repository 312 may be determined. For each data repository, cost estimates for shipping data to other repositories may be determined (e.g., input data 302 to repository 312). The costs for loading data into a repository and for extracting data from a repository may also be determined.

Data shipping matrix 320 is an illustrative matrix of data shipping costs that may be stored in a database as standing data. By way of example, the illustrative data shipping matrix 320 assumes there are s possible repositories. In one example, for s repositories, the data shipping matrix may be an (s+1)×(s+1) matrix. As will be discussed in more detail below, the additional item added to the data shipping matrix may be a null repository. In the illustrative series of operations shown in FIG. 3, there are four repositories, namely input data 302, repository 306, repository 312, and output data repository 318. Thus, a data shipping matrix for this particular series may be a 5×5 matrix. In data shipping matrix 320, each $P_{ij}$ in a cell represents a path for data movement from a source repository i to a target repository j. There may be multiple paths between a pair of repositories. Each path may represent a unique arrangement or order of computing systems. Some of these paths may be direct paths between two repositories. For example, the cell containing the values $P_{21a}$ and $P_{21b}$ represent two paths or computing system arrangements between repository 2 and repository 1 (e.g., input data 302 and repository 306). If additional computing arrangements are possible between repository 2 and repository 1, then additional values may be inserted into this cell. The costs to transfer data across at least one arrangement of computing systems may be at least partially based on elapsed time, utilization, or average throughput. Additional data shipping matrices may be generated for varying data sizes. These matrices may be stored in a data base for later reference.

In one example, the computing systems executing the series of operations shown in FIG. 3 may be rearranged and micro benchmarks may be executed for each arrangement until each cell in the matrix is populated with at least one cost. Thus, while there may not be a direct path between a pair of repositories in one arrangement, an alternate arrangement may create an indirect path. An indirect path between a source and target repository may include an intermediary repository that temporarily houses the data before it is transferred to the target. The cost for this indirect path may also be measured and stored in a cell corresponding to the source and target repository.

As noted above, a null repository may be accounted for in a data shipping matrix. This null repository may represent an unconstrained path between a repository and an operation. Such an unconstrained path may indicate that the repository and the operation are contained within the same computing system or physical computer apparatus. In this instance, the data load rate and data extract rate may have the highest possible value. In the data shipping matrix 320, a null row and null column are shown. The null row shows values $I_1$-$I_S$. These values may represent the cost an operation incurs when loading data directly into a repository (e.g., operation 304 to repository 306). The null column shows values $X_1$-$X_S$. These values may represent the cost an operation incurs when directly extracting data from a repository (e.g., operation 310 extracting from repository 312).

Referring back to FIG. 2, a cost of executing at least one arrangement of operations across at least one arrangement of computing systems/platforms may be determined, as shown in block 206. Referring now to FIG. 4, function shipping matrices 420, 422, 424, and 426 are shown. These matrices may also be stored in a database for later reference. By way of example, a series of operations may have an operation f assigned to an engine $e_x$ executing in a computing system (e.g., an operation to generate content-based keys carried out by a map-reduce engine on a server). Alternate arrangements of the series of operations may be considered such that a performance of operator f may be measured while executing in other engines. If there are p execution engines being used in an arrangement of computing systems, the function shipping costs for each operation may be stored in a p×p matrix. In the example function shipping matrix 420, a cell entry $c_{ix}$ may represent the cost of shipping the execution of f from engine $e_x$ to engine $e_i$. A cell may have multiple entries if the target engine supports multiple implementations of an operation (e.g., a database engine with more than one join method).

In the illustrative function shipping matrices 420, 422, 424 and 426, src may be the execution engine with direct access to a data repository for input to an operation. The execution engine that actually executes the operation processing the input may be tgt. Thus each cell in the matrices shown in FIG. 4 represents a cost of shipping the function from a source engine src to a target engine tgt. An indication that the data and operator are in the same computing system may be when the src engine is the same as the tgt engine. In this instance, the cost may be represented simply as $c_i$. A cost of null may indicate that the execution engine is not enabled to execute the operation (e.g., an SQL engine for an operation written in Java). An indication that the input data needs to be shipped to a computing system hosting the execution engine may be when the src execution engine differs from the tgt execution engine. This shipping cost may be factored into the cost $c_{ix}$.

Function shipping matrix 420 may represent the cost of executing an operation f in engine $e_1$ and engine $e_2$ Function shipping matrix 422 may represent the cost of executing an operation g in engine $e_1$ and engine $e_2$. Once the costs are estimated for each individual operation, the costs of the series of operations may be computed. Thus, function shipping matrix 424 may represent the cost of executing an arrangement of operations f and g across at least one arrangement of execution engine $e_1$ and execution engine $e_2$. The arrangement of operations represented by function shipping matrix 424 may be operation f executing first and operation g executing second. Thus, in function shipping matrix 424 g is the target or the final operation of the series. Furthermore, operation f may execute in either engine $e_1$ or $e_2$. However, as shown in function shipping matrix 422, engine $e_1$ is not enabled to execute g, which is the reason for the null value in the column for engine $e_1$. Function shipping matrix 424 may be generated by computing the distance product of function shipping matrix 420 by function shipping matrix 422. The values shown in the columns for engine $e_2$ represent the cost of operation f executing first in engine $e_1$ and operation g executing second in engine $e_2$; and, operation f executing first in engine $e_2$ and operation g executing second in engine $e_2$.

Function shipping matrix 426 may represent another arrangement of operations f and g. The arrangements represented by function shipping matrix 426 may be operation g executing first and operation f executing second. Thus, in function shipping matrix 426 f is the target or the final operation of the series. Since operation f may execute in either engine $e_1$ or engine $e_2$ all the cells of function shipping matrix 426 may be populated. Function shipping matrix 426 may be generated by computing the distance product of function shipping matrix 422 by function shipping matrix 420. While the costs in function shipping matrix 426 assume that operation g executes before operation f, the costs in function shipping matrix 426 may represent the following four arrangements of computing systems:

Arrangement 1: the data for operation g resides in a computing system comprising engine $e_1$; operation f executes in the computing system comprising engine e1; operation g executes in a computing system comprising engine $e_2$. Thus, the cost $[c_{12}*4*c_{21}]$ may represent the cost incurred by shipping the data for operation g from the computing system hosting engine e1 to the computer system hosting engine e2; processing the data therein with operation g; shipping the results of operation g back to the computing system hosting engine e1; and processing the results therein with operation f.

Arrangement 2: the data for operation g resides in a computing system comprising engine e1; operation f and operation g both execute in a computing system hosting engine $e_2$. Thus, the cost $[c_{12}*4*2]$ may represent the cost incurred when shipping data from the computing system hosting engine $e_1$ to the computing system hosting engine $e_2$; processing the data therein with operation g; and processing the results of operation g therein with operation f.

Arrangement 3: The data for operation g resides in a computing system hosting engine $e_2$; operation g executes in the computing system hosting engine $e_2$; operation f executes on a computing system hosting engine $e_1$; Thus, the cost $[4*c21]$ may represent the cost incurred when executing operation g with the data residing locally in the computing system hosting engine $e_2$; shipping the results thereof to the computing system hosting engine $e_1$; and processing the data therein with operation f.

Arrangement 4: The data for operation g resides in the computing system hosting engine $e_2$; operation f and operation g both execute in the computing system hosting engine $e_2$. Thus, the cost [8] may represent the cost incurred by executing the entire series in the computing system hosting engine $e_2$.

In addition to the function and data shipping matrices discussed above, metadata associated with a series of operations may also be stored in a database. Such metadata may comprise an identifier and textual description of the plurality of operations, links to the source and target datasets, and links to the generated matrices.

Advantageously, the foregoing system, method, and non-transitory computer readable medium generate metric data that can be used when a series of operations is evaluated. Instead of executing an entire process based on a user's limited knowledge, more efficient arrangements may be determined automatically. Since data center infrastructure undergoes periodic changes (e.g., software upgrades, replacement of compute racks, introduction and retirement of applications, etc.) the automatic generation of metrics may be beneficial to maintain an accurate account of the current infrastructure.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   at least one computer apparatus to:
   execute a plurality of operations across a plurality of computing systems to measure a performance of the plurality of operations;
   determine a cost of transferring data across at least one arrangement of the plurality of computing systems;
   determine a cost of executing at least one arrangement of the plurality of operations across the at least one arrangement of the plurality of computing systems; and based on the cost of executing the at least one arrangement of the plurality of operations across the at least one arrangement of the plurality of computing systems, determine whether a user specified arrangement of operations and computing systems executes the plurality of operations more efficiently than executing the at least one arrangement of the plurality of operations across the at least one arrangement of the plurality of computing systems.

2. The system of claim 1, wherein the at least one computer apparatus to instruct at least one processor to generate a series of computer executable instructions which, when executed, instruct the at least one processor to initiate each operation.

3. The system of claim 1, wherein the at least one computer apparatus to carry out the at least one of the plurality of operations.

4. The system of claim 1, wherein each of the plurality of computing systems comprises at least one physical computing apparatus.

5. The system of claim 1, wherein at least some of the plurality of computing systems further comprises at least one data repository.

6. The system of claim 1, wherein the at least one computer apparatus to further instruct at least one processor to store the cost of transferring data and the cost of executing the at least one arrangement in a database.

7. The system of claim 6, wherein the database comprises metadata associated with the plurality of operations.

8. A non-transitory computer readable medium comprising instructions therein which, when executed, instructs at least one processor to:
    execute a series of operations across a plurality of computing platforms to assess a performance of the series;
    determine a cost of transferring data across at least one arrangement of the plurality of computing platforms;
    determine a cost of executing at least one arrangement of the series of operations across at least one arrangement of the plurality of computing platforms;
    store the transfer cost and the executing cost in a database as a cost determination; and
    use the cost determination to determine whether a user specified arrangement of operations and computers systems executes the series of operations more efficiently than executing the at least one arrangement of the series of operations across at least one arrangement of the plurality of computing platforms.

9. The non-transitory computer readable medium of claim 8, wherein the instructions stored therein, when executed, further instruct at least one processor to generate a series of computer executable instructions which, when executed, instruct at least one processor to initiate each operation.

10. The non-transitory computer readable medium of claim 8, wherein at least some of the plurality of computing platforms comprises at least one execution engine to execute at least one operation of the series.

11. The non-transitory computer readable medium of claim 8, wherein each of the plurality of computing platforms comprises at least one physical computing apparatus.

12. The non-transitory computer readable medium of claim 8, wherein at least some of the plurality of computing platforms comprises at least one data repository.

13. The non-transitory computer readable medium of claim 8, wherein the database comprises metadata associated with the series of operations.

14. A method comprising:
    measuring, using at least one processor, a performance of a series of operations as the series executes across a plurality of computing systems;
    calculating, using at least one processor, a cost of transferring data across at least one arrangement of the plurality of computing systems;
    calculating, using at least one processor, a cost of executing at least one arrangement of the series of operations across at least one arrangement of the plurality of computing platforms; and
    storing, using at least one processor, the cost of transferring and the cost of executing in a database as a cost determination; and
    use the cost determination to determine whether a user specified arrangement of operations and computer systems executes the series of operations more efficiently than executing the at least one arrangement of the series of operations across the at least one arrangement of the plurality of computing platforms.

15. The method of claim 14, further comprising generating, using at least one processor, computer executable instructions which, when executed, instruct at least one processor to initiate each operation.

16. The method of claim 14, wherein at least some of the plurality of computing systems comprises at least one execution engine to execute at least one operation in the series.

17. The method of claim 14, wherein each of the plurality of computing systems comprises a physical computing apparatus.

18. The method of claim 14, wherein at least some of the plurality of computing systems comprises at least one data repository.

19. The method of claim 14, wherein the database comprises metadata associated with the series of operations.

20. The method of claim 14, wherein the series of operations includes a first operation and a second operation, the at least one arrangement executes the first operation and the second operation according to a sequence that differs from the user specified arrangement.

* * * * *